SMITH HARPER, OF LEIPERSVILLE, PENNSYLVANIA.

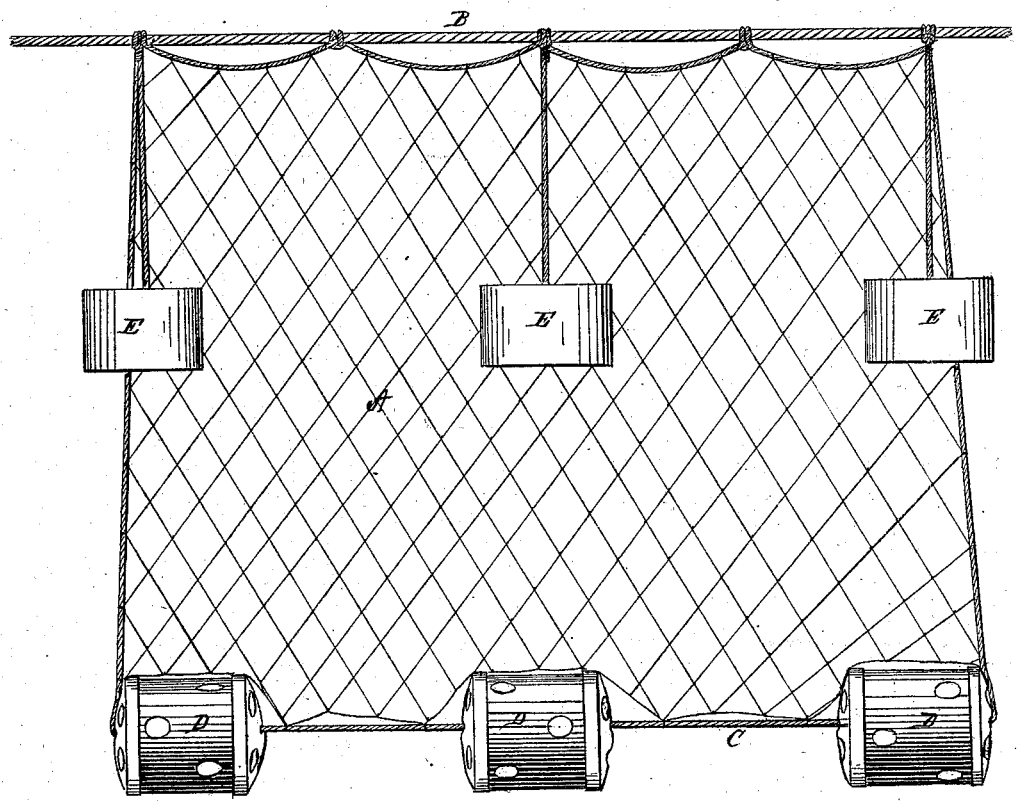

Letters Patent No. 83,493, dated October 27, 1868.

IMPROVEMENT IN FISHING-NETS.

The Schedule referred to in these Letters Patent and making part of the same

*To all whom it may concern:*

Be it known that I, SMITH HARPER, of Leipersville, in the county of Delaware, and in the State of Pennsylvania, have invented certain new and useful Improvements in Fishing-Nets; and do hereby declare that the following is a full, clear, and exact description thereof, reference being had to the accompanying drawings, and to the letters of reference marked thereon.

The nature of my invention consists in the construction and general arrangement of a fishing-net, which will be hereinafter more fully set forth; and also in the use of balls instead of leads or rings for sinking the net.

In order to enable others skilled in the art to which my invention appertains to make and use the same, I will now proceed to describe its construction and operation, referring to the annexed drawings, which form a part of this specification.

I construct a net, A, the bottom of which is longer, say about one-eighth, than the top, and fasten it to the cork and bottom line, in such a manner that the cork-line, B, has twice as many meshes to a tie as the bottom line C.

In the ordinary fishing-nets, which are hung on ropes of equal size, strength, and length, on the cork-line and lead-line, when the net should be drifting in two currents, one fast and the other slow, the strain must come on the bottom as well as on the top, which makes it too tight to gill a fish.

By making the bottom longer than the top, when the strain comes, it must all be on the cork-line, the bottom remaining slack enough to gill a fish, and tangle it so that it is sure to be caught.

At the bottom of the net I use a smaller and weaker line than usual, which is better than a strong rope, for if the net be drifting along with the tide, and should come in contact with rock, stone, or anything that has weight enough to hold the net, my line will break and pass on, with a great deal less injury to the net than it would with a line strong enough to hold.

Instead of leads or rings I use balls, D D, which are round, oval, or oblong, made of metal, or other suitable material, and of such a size that they cannot be put through any of the meshes of the net on which they are used. When laying off the net, the balls being of a smooth surface, will easily roll to the bottom of the net.

The balls, when there is a rough bottom in the river, will roll and pass over, when rings would catch and hold fast.

Corks, E E, are attached by suitable ropes to the cork-line B.

Having thus fully described my invention;

What I claim as new, and desire to secure by Letters Patent, is—

A fishing-net, constructed as described, longer at the bottom than at the top, and the bottom line small and weak, and provided with balls, substantially as and for the purposes herein set forth.

In testimony that I claim the foregoing, I have hereunto set my hand and seal, this 29th day of July, 1868.

SMITH HARPER. [L. S.]

Witnesses:
SILAS S. SAMPLE,
WILLIAM H. JOHNSON.